United States Patent [19]
Yasuda

[11] Patent Number: 5,928,803
[45] Date of Patent: Jul. 27, 1999

[54] TEMPERATURE-SENSITIVE REVERSIBLY DEFORMABLE LAMINATE

[75] Inventor: Michiyuki Yasuda, Aichi, Japan

[73] Assignee: The Pilot Ink Co., Ltd., Aichi, Japan

[21] Appl. No.: 08/827,254

[22] Filed: Mar. 28, 1997

[30] Foreign Application Priority Data

Mar. 29, 1996 [JP] Japan .................................. 8-103503

[51] Int. Cl.$^6$ .................................................. B41M 3/12
[52] U.S. Cl. .................. 428/913; 428/927; 428/315.9; 428/317.1; 428/319.7; 426/126; 426/107
[58] Field of Search .................................. 156/173, 175, 156/245, 633, 156; 425/387.1; 264/314; 428/87, 315.9, 913, 927, 319.7, 317.1; 426/107, 126

[56] References Cited

U.S. PATENT DOCUMENTS

| | | | |
|---|---|---|---|
| 3,717,543 | 2/1973 | Sinclair et al. | 161/186 |
| 5,032,944 | 7/1991 | Ohdoi | 360/126 |
| 5,071,506 | 12/1991 | Nelson et al. | 156/441 |
| 5,316,777 | 5/1994 | Toyoda et al. | 426/87 |

*Primary Examiner*—Merrick Dixon
*Attorney, Agent, or Firm*—Sughrue, Mion, Zinn, Macpeak & Seas, PLLC

[57] ABSTRACT

A temperature-sensitive reversibly deformable laminate which is reversibly deformable towards both sides thereof with changes in temperature to take three states; an original state at room temperature, a contracted state at a low temperature, and an expanded state at a high temperature, wherein the laminate is composed of at least two resin layers having different coefficients of thermal expansion.

12 Claims, 6 Drawing Sheets

TEMPERATURE-SENSITIVE REVERSIBLY DEFORMABLE LAMINATE

BACKGROUND OF THE INVENTION

1. Field of the Invention

The present invention relates to a temperature-sensitive reversibly deformable laminate. Specifically, the present invention relates to a temperature-sensitive laminate which is reversibly deformed towards the surface and back sides direction thereof with a change in temperature to reversibly take three states; an original state in room temperature, a deformed state due to contraction in a low temperature, and a deformed state due to expansion in a high temperature, and to a temperature-sensitive laminate which reversibly changes its color as well as its form with a change in temperature. Particularly, the temperature-sensitive reversibly deformable laminate of the invention is suitable for use as a toy or a decorative element.

2. Description of the Related Art

Bimetals composed of two kinds of metal having different coefficients of thermal expansion, shape memory alloys, and resins are known as a material capable of changing its form with a change in temperature. Bimetals are used as a thermal sensing element such as a thermal sensing switch, and shape memory alloys and resins are applied to industrial parts or subsistence stores.

These materials are, while deformable with changes in temperature, unsuitable for use as a toy or a decorative element because they do not take three different states at room temperature, a low temperature, and a high temperature; they are not easily deformed by a simple and easy thermal elements; and they are relatively costly.

SUMMARY OF THE INVENTION

It is an object of the present invention is to provide a relatively cheap temperature-sensitive reversibly deformable material that can reversibly change its form in three ways with a change in temperature, particularly by a heating or cooling elements available in daily life, and effectively functions as a main body of a toy or a decorative element, and shows visible changes in color as well as form with a change in temperature.

The present invention provides a temperature-sensitive reversibly deformable laminate which is deformable towards both sides thereof with changes in temperature to take three states; an original state at room temperature, a contracted state at a low temperature, and an expanded state at a high temperature, wherein the laminate is composed of at least two resin layers having different coefficients of thermal expansion.

The present invention further provides a temperature-sensitive reversibly deformable laminate which is deformable towards both sides thereof with changes in temperature to take three states; an original state at room temperature, a contracted state at a low temperature, and an expanded state at a high temperature and is also capable of changing its color with changes in temperature, wherein the laminate is composed of at least two resin layers having different coefficients of thermal expansion and an appropriately arranged thermochromic layer that changes its color reversibly.

DETAILED DESCRIPTION OF THE INVENTION

Detailed description of the present invention will be described as follows.

The temperature-sensitive reversibly deformable laminate (hereinafter simply referred to as "the laminate") according to the invention is chiefly applied to toys or decorative elements. That is, the laminate is designed to easily change its appearance from the original state exhibited at room temperature to a deformed state in a high temperature or another deformed state in a low temperature with a change in temperature caused by a daily available heating or cooling element.

In the present invention, the contracted state in a low temperature is a state in which the resin layer having a higher coefficient of thermal expansion contracts to deform the laminate toward the side of that resin layer, and the expanded state in a high temperature is a state in which the resin layer having a higher coefficient of thermal expansion expands to deform the laminate toward the side of the other resin layer having a lower coefficient of thermal expansion, each of the contracted and expanded states being maintained within the respective temperature ranges and being reversible with the original state exhibited at room temperature, and at least one of these states being a curved state.

The laminate is preferably designed so that the changes among the three states may take place in a temperature range of from −20° C. to 80° C. That is, the change in a high temperature may take place at about 80° C. or lower, particularly at a temperature exceeding ambient temperature which ranges from 35 to 60° C., and the change in a low temperature may take place in a temperature range of from −20° to 15° C., especially from −5° to 10° C.

The laminate having a reversibly thermochromic layer is preferably designed to exhibit visible color changes synchronously with the changes in form with changes in temperature.

The resin layers adjacent to each other preferably have a difference in coefficient of thermal expansion of from 0.001 to 20%, the coefficient of thermal expansion being obtained by equation (1):

$$\text{Coefficient of Thermal Expansion } (\%) = [(B-A)/A] \times 100 \tag{1}$$

where A and B represent an actually measured length (cm) of a specimen of a resin after standing at 0° C. and 50° C., respectively, for 2 minutes, the specimen being 1 cm in width, 4.5 cm in length, and not more than 0.5 cm in thickness as prepared at room temperature.

If the difference in the thermal expansion coefficient between the two adjacent resin layers is less than 0.001%, it is difficult to deform the laminate with the above-described daily available cooling element such as an ice, various kinds of cool accumulating bodies, cooling in a refrigerator or a freezer and a cool air generating device incorporating ice pieces therein, and a heating element such as a dryer, warm water and various kinds of heaters used in a house. On the other hand, if the difference exceeds 20%, the resin having a higher coefficient of thermal expansion undergoes conspicuous expansion when heat-treated (e.g., fusion-bonded) in the process of producing the laminate, which tends to reduce the productivity. Further, the laminate sensitively responds to even a slight temperature change, thereby giving limited appeal to vision as a toy or a decorative element that is expected to show changes in form in a visual manner. For securing satisfactory productivity and a satisfactory manner of deformation and also in view of freedom of choice of material, processability, and cost, a still preferred difference in thermal expansion coefficient is about 0.05 to 15%.

The resins constituting the resin layers of the laminate include ionomer resins, isobutylene-maleic anhydride copolymer resins, acrylonitrile-acrylic styrene copolymer resins, acrylonitrile-styrene copolymer resins, acrylonitrile-butadiene-styrene copolymer resins, acrylonitrile-chlorinated polyethylene-styrene copolymer resins, ethylene-vinyl chloride copolymer resins, ethylene-vinyl acetate copolymer resins, ethylene-vinyl acetate-vinyl chloride graft copolymer resins, vinylidene chloride resins, vinyl chloride resins, chlorinated vinyl chloride resins, vinyl chloride-vinylidene chloride copolymer resins, chlorinated polyethylene resins, chlorinated polypropylene resins, polyamide resins, high-density polyethylene resins, medium-density polyethylene resins, linear low-density polyethylene resins, polyethylene terephthalate resins, polybutylene terephthalate resins, polycarbonate resins, polystyrene resins, high impact polystyrene resins, polypropylene resins, polymethylstyrene resins, polyacrylic ester resins, polymethyl methacrylate resins, epoxy acrylate resins, alkyl phenol resins, rosin-modified phenolic resins, rosin-modified alkyd resins, phenolic resin-modified alkyd resins, epoxy resin-modified alkyd resins, styrene-modified alkyd resins, acryl-modified alkyd resins, amino alkyd resins, vinyl chloride-vinyl acetate copolymer resins, styrene-butadiene copolymer resins, epoxy resins, unsaturated polyester resins, polyurethane resins, vinyl acetate-based emulsion resins, styrene-butadiene-based emulsion resins, acrylic ester-based emulsion resins, water-soluble alkyd resins, water-soluble melamine resins, water-soluble urea resins, water-soluble phenolic resins, water-soluble epoxy resins, water-soluble polybutadiene resins, cellulose acetate, cellulose nitrate, ethyl cellulose, polyester resins, polyvinyl alcohol resins, ethylene-vinyl alcohol copolymer resins, fluorocarbon resins, polyimide resins, polyphenylene oxide resins, polysulfone resins, TPX polymers, poly-p-xylene resins, polyamideimide resins, polyester imide resins, polybenzimidazole resins, rubber hydrochloride resins, and oblate.

The resin layers can be in most cases previously molded resin films or resin molded articles of various shapes. The resin layers may be adhesive resin layers or coating resin layers which have a thickness of about 10 µm or more and have a functional of curving.

Particularly effective resin layers of film form include a high pressure processed polyethylene film, a medium-low pressure processed polyethylene film, a crosslinked polyethylene film, an ethylene-vinyl acetate copolymer film, an ethylene-acrylic ester copolymer film, an ionomer film, an ethylene-propylene copolymer film, a polypropylene film, a vinyl chloride-propylene film, a polystyrene film, a polyvinyl chloride film, a polyvinyl chloride film, a polyvinyl alcohol film, a fluorocarbon resin film, a polycarbonate film, an acetyl cellulose film, a polyester film, a polyamide film, a rubber hydrochloride film, a polyimide film, a polyurethane film, an oblate film, a regenerated intestinal film, a polypeptide film, and an amino acid film.

A transparent iris-like multilayer film can also be used as a resin layer of film form. Examples of such a film include a multilayer film comprising a pair of polypropylene layers having therebetween 113 layers composed of a thin layer of an ethylene-vinyl acetate copolymer and a thin layer of polystyrene alternating with each other and having a total thickness of 15 µm, the reflected light of which having interference colors of blue and green; a multilayer film comprising a pair of polypropylene layers having therebetween 113 layers composed of a thin layer of an ethylene-vinyl acetate copolymer and a thin layer of polystyrene alternating with each other and having a total thickness of 17 µm, the reflected light of which having interference colors of green and red; a multilayer film comprising a pair of polypropylene layers having therebetween 226 layers of a thin layer of an ethylene-vinyl acetate copolymer and a thin layer of polystyrene alternating with each other and having a total thickness of 28 µm, the reflected light from which having interference colors of blue and green; a multilayer film comprising a pair of polypropylene layers having therebetween 226 layers of a thin layer of an ethylene-vinyl acetate copolymer and a thin layer of polystyrene alternating with each other and having a total thickness of 31 µm, the reflected light from which having interference colors of red and green; a multilayer film comprising a pair of polyester layers having therebetween 113 layers of a polyester thin film and a polyolefin thin film alternating with each other and having a total thickness of 15 µm, the reflected light from which having interference colors of blue and green; a multilayer film comprising a pair of polyester layers having therebetween 113 layers of a polyester thin film and a polyolefin thin film alternating with each other and having a total thickness of 17 µm, the reflected light from which having interference colors of red and green; a multilayer film comprising a pair of polypropylene layers having therebetween 113 layers of a polyolefin thin layer and a polyester thin layer alternating with each other and having a total thickness of 15 µm, the reflected light of which having interference colors of blue and green; a multilayer film comprising a pair of polypropylene layers having therebetween 113 layers of a polyolefin thin layer and a polyester thin layer alternating with each other and having a total thickness of 17 µm, the reflected light from which having interference colors of red and green; a multilayer film comprising a pair of acrylic resin layers having therebetween 113 layers of a polyester thin layer and an acrylic resin thin layer alternating with each other and having a total thickness of 15 µm, the reflected light of which having interference colors of blue and green; a multilayer film comprising a pair of acrylic resin layers having therebetween 113 layers of a polyester thin layer and an acrylic resin thin layer alternating with each other and having a total thickness of 17 µm, the reflected light of which having interference colors of red and green; a multilayer film comprising a pair of acrylic resin layers having therebetween 113 layers of a polyester thin layer and an acrylic resin thin layer alternating with each other and having a total thickness of 30 µm, the reflected light of which having interference colors of blue and green; a multilayer film comprising a pair of acrylic resin layers having therebetween 113 layers of a polyester thin layer and an acrylic resin thin layer alternating with each other and having a total thickness of 34 μm, the reflected light of which having interference colors of red and green; a multilayer film comprising a pair of acrylic resin layers having therebetween 226 layers of a polyester thin layer and an acrylic resin thin layer alternating with each other and having a total thickness of 28 μm, the reflected light of which having interference colors of blue and green; a multilayer film comprising a pair of acrylic resin layers having therebetween 226 layers of a polyester thin layer and an acrylic resin thin layer alternating each other, having a total thickness of 31 μm, the reflected light of which having interference colors of red and green; a multilayer film comprising a pair of polyester resin layers having therebetween 113 layers of a polyester thin layer and an acrylic resin thin layer alternating with each other and having a total thickness of 15 μm, the reflected light of which having interference colors of blue and green; and a multilayer film comprising a pair of polyester resin layers having therebetween 113 layers of a polyester thin layer and an acrylic resin thin layer alternating with each other and having a total thickness of 17 μm, the reflected light of which having interference colors of red and green.

These transparent iris-like multilayer films have subtle and colorful metallic luster and variety of color.

A metallized film can also be used as a resin layer of film form. Examples of metallized films are films of polyester, unplasticized polyvinyl chloride, acetyl cellulose, polycarbonate, polypropylene, polystyrene, etc. having thereon a deposit of aluminum, silver, zinc, etc.

The above-described transparent iris-like multilayer films and metallized films give a splendid luster to the laminate and makes the change of state with a temperature change more distinct and more impressive.

The laminate having resin layers of film form includes the one composed of two films having different coefficients of thermal expansion, the one composed of three or more films, and the one composed of two or more films made of the same material and at least one film made of a different material.

The resin molded articles which can be used as a resin layer of the laminate include small pieces other than films and extruded or injection molded articles of any shape and size.

The laminate comprising resin layers of film form or molded form can be prepared by bonding two or more resin layers by means of an adhesive or by heat fusion or ultrasonic welding.

Suitable examples of the aforesaid adhesive layer or coating resin layer include layers formed of various hot melt adhesives, alkyl phenol resins soluble or dispersible in water or organic solvents, rosin-modified phenolic resins, rosin-modified alkyd resins, styrene-modified alkyd resins, acryl-modified alkyd resins, amino alkyd resins, vinyl chloride-vinyl acetate resins, styrene-butadiene resins, epoxy resins, acrylic ester resins, unsaturated polyester resins, polyurethane resins, vinyl acetate-based emulsion resins, styrene-butadiene-based emulsion resins, acrylic ester-based emulsion resins, water-soluble alkyd resins, water-soluble melamine resins, water-soluble urea resins, water-soluble phenolic resins, water-soluble epoxy resins, water-soluble polybutadiene resins, cellulose derivatives, polyvinyl alcohol resins, and other adhesives.

The choice of material and thickness of the adhesive layer or coating resin layer has an influence on the temperature-dependent deformability of the laminate. Where the adhesive layer or coating resin layer is not required to take part in deformation in relation to other resin layer(s), it should be a thin layer of 10 μm or smaller in thickness or be made of a material whose thermal expansion coefficient is not so different from that of the adjacent resin layer as to cause deformation of the laminate. To the contrary, where the adhesive layer or coating resin layer is designed to serve as a resin layer causing deformation, it should have a thickness of at least 10 μm, preferably 20 μm or more, or be made of a material whose thermal expansion coefficient is sufficiently different from that of the other resin layer so as to cause the laminate to be deformed.

If desired, the resin layer constituting the laminate may contain a thermochromic material. Thermochromic materials suited for use in the invention are those comprising an electron-donating color forming organic compound, an electron-accepting compound, and a reaction-mediating organic compound which reversibly induces a color forming reaction between the electron donor and the electron acceptor. Examples of such thermochromic materials are disclosed in JP-B-51-35414 (the term "JP-B" as used herein means an "Examined Japanese Patent Publication"), JP-B-51-44706, and JP-B-1-17154, including:

(1) a thermochromic material essentially comprising (a) an electron-donating color forming organic compound, (b) a compound having a phenolic hydroxyl group, and (c) an aliphatic monohydric alcohol;

(2) a thermochromic material essentially comprising (a) an electron-donating color forming organic compound, (b) a compound having a phenolic hydroxyl group, and (c) a compound selected from esters produced from an aliphatic monohydric alcohol and an aliphatic monocarboxylic acid;

(3) an encapsulated thermochromic material essentially comprising (a) an electron-donating color forming organic material, (b) a compound having a phenolic hydroxyl group, and (c) a compound selected from one of higher aliphatic monohydric alcohols and esters produced from an aliphatic monocarboxylic acid and an aliphatic monohydric alcohol; or (4) a thermochromic material comprising a vehicle having dissolved or dispersed therein (a) an electron-donating color forming organic compound, (b) a compound having a phenolic hydroxyl group, and (c) a compound selected from one of higher aliphatic monohydric alcohols and esters produced from an aliphatic monocarboxylic acid and an aliphatic monohydric alcohol.

Further, the thermochromic materials are also effective in the present invention.

(5) A thermochromic material described in JP-A-7-186546 (the term "JP-A" as used herein means an "Unexamined Japanese Patent Publication") comprises (a) an electron-donating color forming organic compound selected from pyridine compounds, quinazoline compounds and bisquinazoline compounds, (b) a compound accepting an electron emitted from (a), and (c) a reaction mediating compound which reversibly induces a color forming reaction between (a) and (b) in a specific temperature range, the three components (a), (b) and (c) being compatible with each other, and which assumes a fluorescent color of yellow, yellowish orange, orange, reddish orange, red, etc. with high density and brightness upon color formation and returns to a colorless state with no residual color.

(6) A thermochromic material in JP-B-4-17154, which is a temperature-dependent thermochromic and color memory material changing its color with great hysteresis. Namely, this material has a feature that the plotted curve of color density of "temperature increasing from a point below the color changing temperature range" and of "temperature dropping from a point above the color changing temperature range" form the respective curves greatly different from each other, and has a memory of its color exhibited at or below the lower color changing point or at or above the higher color changing point and retains that color in an ambient temperature range between the lower color changing point and the higher color changing point.

(7) A highly sensitive thermochromic material described in JP-B-1-29398 has a feature that the color density vs. temperature curve has a hysteresis width of 3° C. or less.

(8) A thermochromic material disclosed in JP-A-6-135144 comprises (a) an electron-donating color forming organic compound, (b) a compound having a phenolic hydroxyl group, and (c) a reaction mediating compound deciding the temperature at which a color forming reaction between (a) and (b) is induced, the components (a), (b), and (c) forming a homogeneous mixture and being finely dispersed in a vinyl chloride-vinyl acetate copolymer resin.

The thermochromic material is preferably used as encapsulated into microcapsules so that the material may always keep a constant composition and constant activity irrespective of the conditions of use. That is, encapsulation of the thermochromic material provides physically stable pigment particles. The microcapsules for the practice of the invention have a particle size of 0.1 to 100 $\mu$m, preferably 3 to 30 $\mu$m.

Encapsulation of the thermochromic material can be carried out by a conventionally known method, such as interfacial polymerization, in situ polymerization, in-liquid hardening coating, phase separation from an aqueous solution, phase separation from an organic solvent, melt dispersion and cooling, in-gas suspension coating, and spray drying. If desired, a secondary resin coating film may be provided on the surface of the microcapsules for improving durability, or the surface characteristics of the microcapsules may be modified for practical use.

The thermochromic material may also be dispersed in a medium containing a fixing agent, which is applied as a color material of an ink or paint, and can be applied on the resin layer of a substrate to form a reversible thermochromic layer thereon by coating or spraying.

In this case, the thermochromic material is used in an amount of 0.5 to 40% by weight, preferably 1 to 30% by weight, based on the resulting coating resin layer. If the amount is less than 0.5%, a distinct thermochromic effect is hard to perceive visually. If it exceeds 40%, a residual color tends to remain after decoloring.

The reversible thermochromic layer can be formed by known methods, such as screen printing, offset printing, gravure printing, coater application, padding, transfer, brush coating, spraying, electrostatic coating, electrodeposition, cast coating, roller coating, and dip coating.

The reversible thermochromic layer can be designed to show color changes in a subtler and more complicated way by incorporating an appropriate amount of a colorant (pigment or dye) having no thermochroism. It is also possible to provide an image of design or letters comprising the non-thermochromic colorant underneath the reversible thermochromic layer so that the image may reversibly appear and disappear with the color change of the thermochromic layer.

When the temperature for changes in color of the thermochromic material and the temperature for changes in form of the laminate are approximately the same, the changes in form and color occur synchronously, thereby producing more attractive effects as a toy or a decorative element.

The laminate can have fabric, such as woven fabric, knitted fabric, braid, nonwoven fabric, lace, and mesh, bonded to the outermost resin layer thereof thereby to have a soft texture and a unique appearance effective as, for example, clothing for dolls or other decorative elements.

In particular fabric having a mesh structure is suitably used in the laminate having a resin layer or adhesive layer containing the thermochromic material.

When fabric having a mesh structure is used on the outermost resin layer, not only is afforded a soft texture, but the color changes of the thermochromic material or the luster of the transparent iris-like multilayer film or the metallized film can be seen through the mesh. Examples of suitable mesh structures are tricot, leaver lace, embroidery lace, raschel lace, torsion lace, tulle, plain net, gauze, organdie, void, and mesh.

In order to further diversify the thermal changes, the outermost resin layer of the laminate may be subjected to flock coating using nylon fiber, rayon fiber, acetate fiber, polyvinyl chloride fiber, polyvinylidene fiber, polyvinyl alcohol fiber, polychlal, cotton, glass fiber, etc. The fibers usually have a thickness of 0.5 to 20 denier and a length of about 0.3 to 3 mm. Thicker and longer fibers are sometimes used depending on the end use. Combinations of fibers having different thicknesses or lengths, combination of fibers made of different materials, crimped or curved fibers and the like may be used. The flock may be fixed onto the surface non-vertically by using a low viscosity adhesive.

In the laminate of the present invention, each layer may have a light stabilizer layer. In the light stabilizer layer, an light stabilizer selected from an ultraviolet absorber, an age resister (e.g., antioxidant), a singlet state oxygen quencher, a superoxide anion quencher, an ozone quencher, a visible light absorber, and an infrared absorber is fixedly dispersed therein.

If desired, in order to improve the function such as the luster or durability of the laminate, the coating resin layer, the adhesive resin layer and the thermochromic layer may contain flakes having a metallic luster (e.g., titanium dioxide-coated mica, iron oxide/titanium dioxide-coated mica, iron oxide-coated mica, guanine, sericite, basic lead carbonate, acid lead arsenate, and bismuth oxychloride), metallic powder, fish scales, glass powder, seashell powder, lustrous fine pieces obtained by cutting a lustrous film (e.g., a resin film having a deposit of aluminum, etc., a transparent iris-like multilayer film showing interference of light, which comprises 100 or more intermediate layers made of two or more kinds of polymers having different refractive indices, a film having an interference fringe comprising at least one of an oxide, a sulfide and a fluoride, and a hologram film having a fine uneven pattern having at least one side thereof a reflecting layer), an aging resister, an antistatic agent, a polarity imparting agent, a thixotropic agent, a defoaming agent, and the like.

The present invention will now be illustrated in greater detail with reference to Examples. Unless otherwise indicated, all the parts and percents are given by weight.

In Examples, the coefficient of thermal expansion (%) of resin layers was obtained according to the equation (1) of Coefficient of Thermal Expansion (%)=$[(B-A)/A] \times 100$ where A and B represent an actually measured length (cm) of a specimen of a resin after standing at 0° C. and 50° C., respectively, for 2 minutes, the specimen being 1 cm in width, 4.5 cm in length, and not more than 0.5 cm in thickness as prepared at room temperature.

EXAMPLE 1

Figure 1:
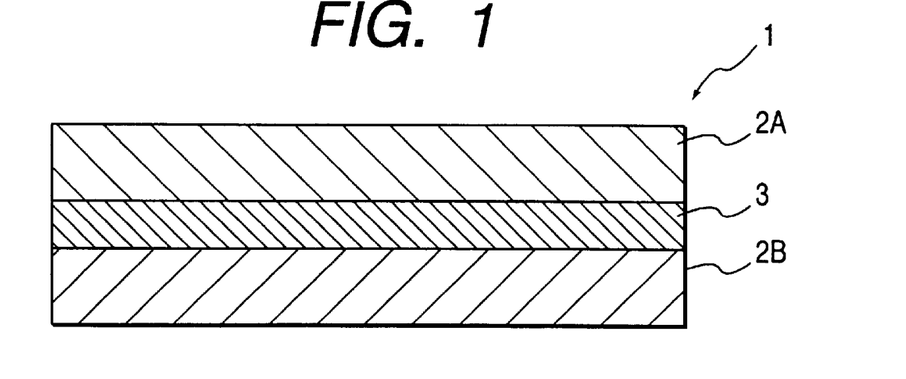
FIG. 1 is a schematic cross sectional view showing a deformation/displacement state of one embodiment of a temperature-sensitive reversibly deformable laminate of the present invention in its original state at room temperature.
Figure 2:
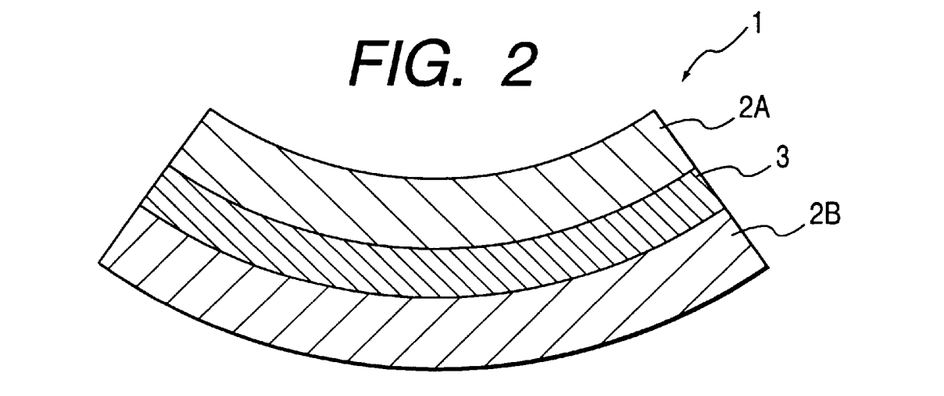
FIG. 2 is a schematic cross sectional view showing a deformation/displacement state of one embodiment of the temperature-sensitive reversibly deformable laminate of the present invention in its deformed state in a high temperature.
Figure 3:
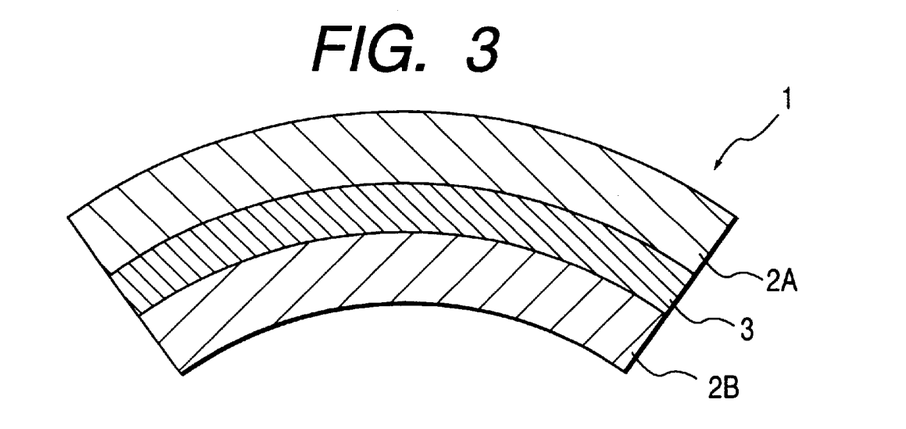
FIG. 3 is a schematic cross sectional view showing a deformation/displacement state of one example of the temperature-sensitive reversibly deformable laminate of the present invention in its deformed state in a low temperature.

In this example, FIGS. 1 through 3 are referred to.

A high-density polyethylene film (thickness: 50 μm; thermal expansion coefficient: 0.4%) as a resin layer 2B was coated with an adhesive solution of an acrylic resin in toluene and ethyl acetate (solid content: 40%) to form an adhesive layer 3. After evaporating the solvent, a stretched polypropylene film (thickness: 50 μm; thermal expansion coefficient: 0%) as a resin layer 2A was laminated on the resin layer 2B via adhesive layer 3 by pressing with a roller at room temperature to obtain a temperature-sensitive reversibly deformable laminate 1.

The laminate 1 was in a non-curved state (FIG. 1) at room temperature (15 to 35° C.) but curved toward the side of resin layer 2A (FIG. 2) at 40° C. or above and toward the side of resin layer 2B (FIG. 3) at 10° C. or below. The two curved states were maintained within the respective temperature ranges, and on being left at room temperature, the laminate was restored to its non-curved state and maintained that state. These changes in form occurred repeatedly with changes in temperature.

EXAMPLE 2

In this example, FIG. 1 is referred to. An unstretched polypropylene film (thickness: 90 μm; thermal expansion coefficient: 0.5%) as a resin layer 2B was coated with a xylol/toluene mixed solvent by doctor coating to form an adhesive layer 3. Before the solvent was dried, a polystyrene film (thickness: 25 μm; thermal expansion coefficient: 0.05%) was bonded thereto with a roller, and the laminate was bent toward the side of a resin layer 2A and kept in that state at room temperature until the solvent dried to a obtain temperature-sensitive reversibly deformable laminate 1.

While the laminate 1 was in a curved state to the side of a resin layer 2A at room temperature, the curve became gentle and nearly flattened (FIG. 1) at 40° C. or above. To the contrary, the curve became sharper to the side of the resin layer 2A at 10° C. or below than at room temperature. The laminate maintained that flattened state and the sharply curved state in the respective temperature ranges. On being allowed to stand at room temperature, the laminate returned to the original curved state and maintained that state. These changes in form occurred repeatedly with changes in temperature.

EXAMPLE 3

In this example, FIG. 1 is referred to. A stretched polypropylene film (thickness: 90 μm; thermal expansion coefficient: 0%) as a resin layer 2B was coated with an adhesive solution of an acrylic resin in toluene and ethyl acetate (solid content: 40%) by gravure coating to form an adhesive layer 3. After evaporating the solvent, an unstretched polypropylene film (thickness: 60 μm; thermal expansion coefficient: 0.5%) as a resin layer 2A was laminated on the resin layer 2B via the adhesive layer 3 by pressing with a roller at room temperature. The laminate was allowed to stand in a non-curved state at 0° C. until the resin layers adhered sufficiently to obtain a temperature-sensitive reversibly deformable laminate 1.

The laminate 1 took a curved state toward the side of the resin layer 2B at room temperature, and the curvature increased at 40° C. or above. At 10° C. or below, the curve became gentle and nearly flattened. Upon being left at room temperature, the laminate was restored to its original curved state toward the resin layer 2B. These changes in form occurred repeatedly with changes in temperature.

EXAMPLE 4

In this example, FIG. 1 is referred to. A low-density polyethylene film (thickness: 55 μm; thermal expansion coefficient: 1.1%) as a resin layer 2B was coated with an adhesive solution (solid content: 40%) of an acrylic resin in toluene and ethyl acetate by gravure coating to form an adhesive layer 3. After evaporating the solvent, a vinylidene chloride film (thickness: 15 μm; thermal expansion coefficient: 0.05%) as a resin layer 2A was laminated on the adhesive layer 3 by pressing with a roller at room temperature to obtain a temperature-sensitive reversibly deformable laminate 1.

The laminate 1 was in a non-curved state at room temperature (15 to 35° C.) but curved toward the side of the resin layer 2A at 40° C. or above and toward the side of the resin layer 2B at 10° C. or below. The two curved states were maintained within the respective temperature ranges, and on being left at room temperature, the laminate was restored to its non-curved state and maintained that state. These changes in form occurred repeatedly with changes in temperature.

EXAMPLE 5

Figure 4:
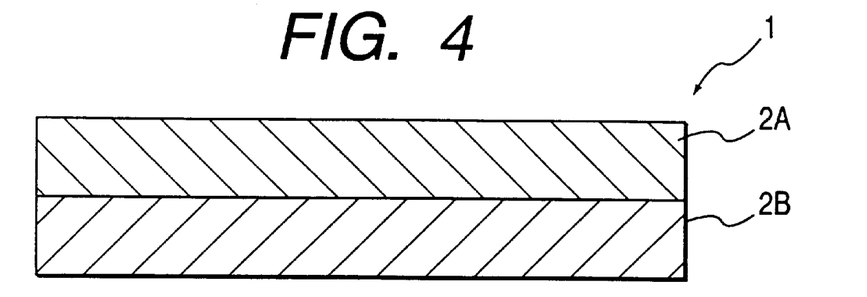
FIGS. 4 to 19 are each a schematic cross section of other examples of the temperature-sensitive reversibly deformable laminate of the invention.

In this example, FIG. 4 is referred to. A high-density polyethylene film (thickness: 20 μm; thermal expansion coefficient: 0.4%) as a resin layer 2B was coated with a coating resin solution of a polystyrene resin (thermal expansion coefficient: 0.05%) in xylol and toluene (solid content: 50%) by doctor coating. The solvent was gradually evaporated at room temperature to form a resin layer 2A to obtain a temperature-sensitive reversibly deformable laminate 1.

The laminate 1 was in a non-curved state (FIG. 4) at room temperature (15 to 35° C.) but curved toward the side of the resin layer 2A at 40° C. or above. At 10° C. or below, it curved toward the side of the resin layer 2B. The two curved states were maintained within the respective temperature ranges, and on being left at room temperature, the laminate was restored to its non-curved state and maintained that state. These changes in form occurred repeatedly with changes in temperature.

EXAMPLE 6

In this example, FIG. 4 is referred to. A high-density polyethylene film (thickness: 50 μm; thermal expansion coefficient: 0.4%) as a resin layer 2B and a nylon film (thickness: 15 μm; thermal expansion coefficient: 0%) as a resin layer 2A were bonded by heat fusion to obtain a temperature-sensitive reversibly deformable laminate 1.

The laminate 1 was in a non-curved state (FIG. 4) at room temperature (15 to 35° C.) but curved toward the side of the resin layer 2A at 40° C. or above. At 10° C. or below, it curved toward the side of the resin layer 2B. The two curved states were maintained within the respective temperature ranges, and on being left at room temperature, the laminate was restored to the non-curved state and maintained that state. These changes in form occurred repeatedly with changes in temperature.

EXAMPLE 7

Figure 5:
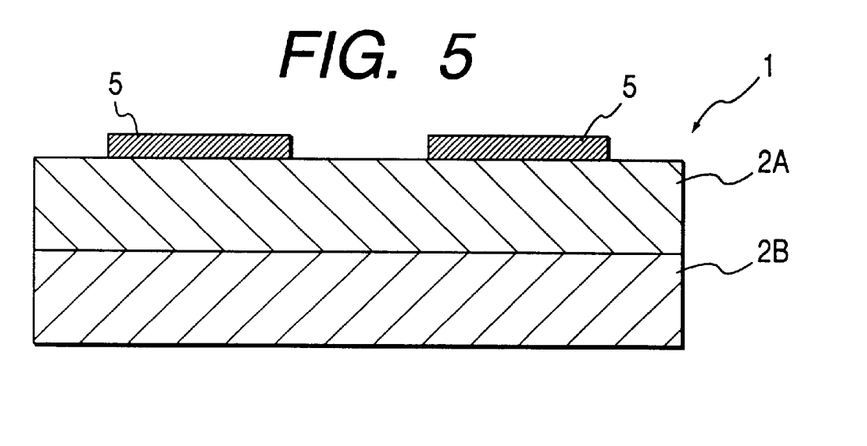

In this example, FIG. 5 is referred to. Ten parts of a reversible thermochromic pigment (pink at about 10° C. or below and colorless at about 15° C. or above) prepared by encapsulating a reversible thermochromic material comprising 3 parts of 1,2-benz-6-diethylaminofluoran, 5 parts of bisphenol A, 25 parts of myristyl alcohol and 25 parts of decyl myristate with an epoxy resin film, 10 parts of a vinyl chloride-vinyl acetate copolymer resin, 30 parts of cyclohexanone, 30 parts of an aromatic solvent and 1 part of a defoaming agent were mixed and dispersed to prepare a thermochromic ink composition. The resulting ink composition was screen printed on a polyethylene terephthalate film (thickness: 25 µm; thermal expansion coefficient: 0%) as a resin layer 2A to form reversible thermochromic layer 5.

A low-density polyethylene film (thickness: 60 µm; thermal expansion coefficient: 1.1%) as a resin layer 2B was coated with a mixture of 50 parts of a solution of a urethane resin in methyl ethyl ketone and isopropyl alcohol (solid content: 15%), 2 parts of an isocyanate curing agent and 10 parts of methyl ethyl ketone by gravure coating. After the solvent was evaporated, the polyethylene film was laminated on the non-printed side of the polyethylene terephthalate film by pressing with a roller under heating. The laminate was allowed to stand in a flat state at 50° C. until the films adhered sufficiently to obtain a temperature-sensitive deformable and thermochromic laminate 1.

The laminate 1 was in a curved state toward the side of resin 2B at room temperature, but the curve became gentle and nearly flattened at 40° C. or above. At 10° C. or below, the laminate made its curve toward the side of the resin layer 2B sharper than at room temperature and, at the same time, turned to pink. On being allowed to stand at room temperature, the laminate was restored to its original curved and colorless state. These changes in form and color occurred repeatedly with changes in temperature.

EXAMPLE 8

Figure 6:
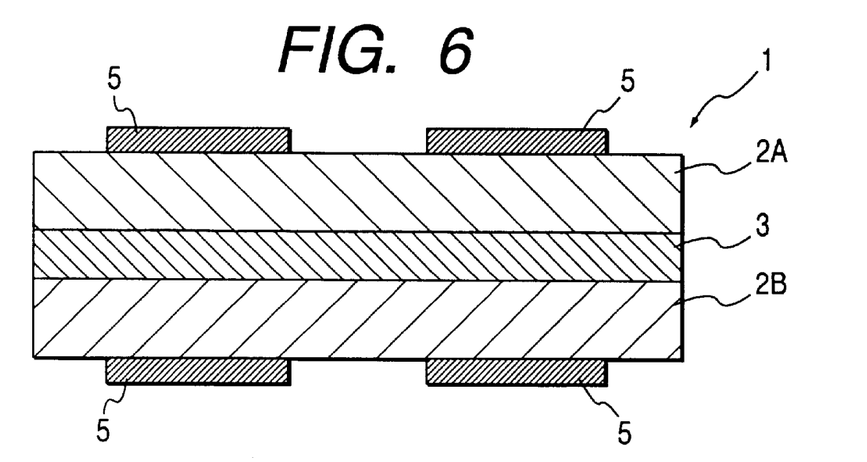

In this example, FIG. 6 is referred to. A polyethylene terephthalate film (thickness: 25 µm; thermal expansion coefficient: 0%) as a resin layer 2B was coated with an adhesive solution of an acrylic resin in toluene and ethyl acetate (solid content: 40%) to form an adhesive layer 3. After evaporating the solvent, a polyvinyl chloride film (thickness: 60 µm; thermal expansion coefficient: 0.4%) as a resin layer 2A was laminated on resin layer 2B via the adhesive layer 3 by pressing with a roller at room temperature.

Ten parts of a reversible thermochromic pigment (blue at about 30° C. below and colorless at about 30° C. or above) prepared by encapsulating a reversible thermochromic material comprising 1 part of 3-(2-ethoxy-4-diethylaminophenyl)-3-(1-ethyl-2-methylindol-3-yl)-4-azaphthalide, 4 parts of bisphenol A, 25 parts of cetyl alcohol and 25 parts of stearyl caprate with an epoxy resin film, 50 parts of a toluene solution of an acrylic resin (solid content: 50%), 40 parts of cyclohexanone, and 1 part of a defoaming agent were mixed and dispersed to prepare a thermochromic ink composition. The resulting ink composition was screen printed on the resin layer 2B in polka dots to form a reversible thermochromic layer 5.

Ten parts of a reversible thermochromic pigment (pink at about 10° C. or below and colorless at about 15° C. or above) prepared by encapsulating a reversible thermochromic material comprising 3 parts of 1,2-benz-6-diethylaminofluoran, 5 parts of bisphenol A, 25 parts of myristyl alcohol, and 25 parts of decyl myristate with an epoxy resin film, 20 parts of a vinyl chloride-vinyl acetate copolymer resin, 30 parts of cyclohexanone, 30 parts of an aromatic solvent, and 1 part of a defoaming agent were mixed and dispersed to prepare a thermochromic ink composition. The ink composition was screen printed on the resin layer 2A in a floral pattern to form the reversible thermochromic layer 5. There was obtained a temperature-sensitive reversible deformable and thermochromic laminate 1.

The laminate 1 was in a non-curved state (FIG. 6) and showed the blue polka dots at room temperature. At 40° C. or above, the blue polka dots disappeared and the laminate curved toward the side of the resin layer 2B. At 10° C. or below, the pink floral pattern appeared in addition to the blue polka dots, and the laminate curved toward the side of the resin layer 2A. Upon being allowed to stand at room temperature, the pink floral pattern disappeared, and the laminate was restored to its original state, i.e., non-curved and showing the blue polka dots. These changes in form and color (design) occurred repeatedly with changes in temperature.

EXAMPLE 9

Figure 7:
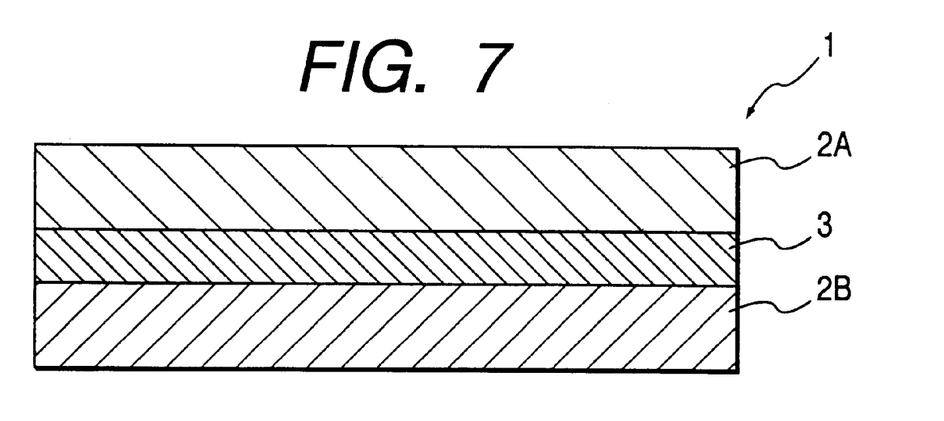

In this example, FIG. 7 is referred to. 99 part of a low-density polyethylene resin was mixed with 1 part of a reversible thermochromic pigment (pink at about 30° C. below and colorless at about 30° C. or above) prepared by encapsulating a reversible thermochromic material comprising 3 parts of 1,2-benz-6-diethylaminofluoran, 5 parts of bisphenol A, 25 parts of cetyl alcohol and 25 parts of stearyl caprate with an epoxy resin film, and 1 part of a reversible thermochromic pigment (blue at about 10° C. or below and colorless at about 15° C. or above) prepared by encapsulating a reversible thermochromic material comprising 1 part of 3-(2-ethoxy-4-diethylaminophenyl)-3-(1-ethyl-2-methylindol-3-yl)-4-azaphthalide, 4 parts of bisphenol A, 25 parts of myristyl alcohol, and 25 parts of decyl myristate with an epoxy resin film, and the mixture was molded to prepare a 100 µm thick film (thermal expansion coefficient: 1.1%) as a resin layer 2B. The resin layer 2B was coated with an adhesive solution of an acrylic resin in toluene and ethyl acetate (solid content: 40%) by gravure coating to form an adhesive layer 3. After evaporating the solvent, a polyethylene terephthalate film (thickness: 25 µm; thermal expansion coefficient: 0%) as a resin layer 2A was laminated on the resin layer 2B via the adhesive layer 3 by pressing with a roller at room temperature to obtain a temperature-sensitive reversibly deformable and thermochromic laminate 1.

The laminate 1 assumed a pink color and was in a non-curved state at room temperature but turned colorless and curved toward the side of the resin layer 2A at 30° C. or above. When cooled to 10° C. or below, the laminate 1 turned purple and curved toward the side of the resin layer 2B. On being left to a stand at room temperature, the laminate 1 was restored to its original pink and non-curved state. These changes in form and color occurred repeatedly with changes in temperature.

EXAMPLE 10

Figure 8:
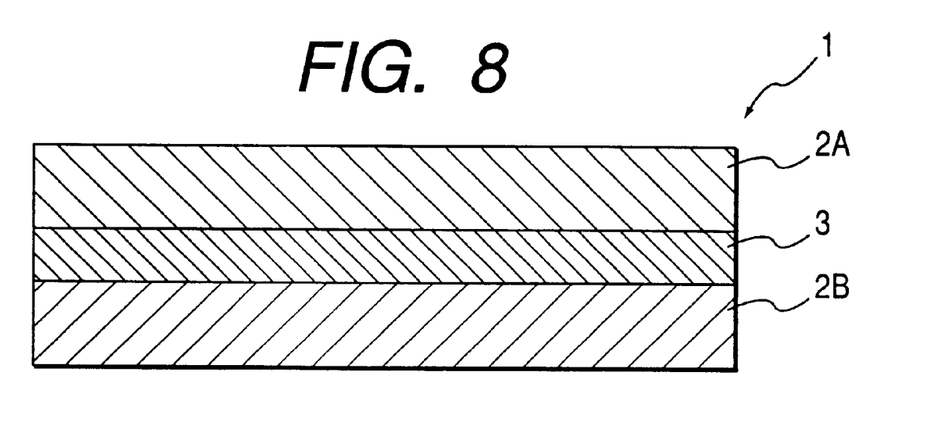

In this example, FIG. 8 is referred to. A mixture of 98 part of a high-density polyethylene resin and 2 parts of a reversible thermochromic pigment (pink at about 30° C. below and colorless at about 30° C. or above) prepared by encapsulating a reversible thermochromic material comprising 3 parts of 1,2-benz-6-diethylaminofluoran, 5 parts of bisphenol A, 25 parts of cetyl alcohol and 25 parts of stearyl caprate with an epoxy resin film was molded to obtain a 100 μm thick film (thermal expansion coefficient: 0.4%) as a resin layer 2B. Separately, a mixture of 98 part of a nylon resin and 2 parts of a reversible thermochromic pigment (blue at about 10° C. or below and colorless at about 15° C. or above) prepared by encapsulating a reversible thermochromic material comprising 1 part of 3-(2-ethoxy-4-diethylaminophenyl)-3-(1-ethyl-2-methylindol-3-yl)-4-azaphthalide, 4 parts of bisphenol A, 25 parts of myristyl alcohol and 25 parts of decyl myristate with an epoxy resin film was molded to prepare a 50 μm thick film (thermal expansion coefficient: 0%) as a resin layer 2A. The resin layer 2B was coated with an adhesive solution of an acrylic resin in toluene and ethyl acetate (solid content: 40%) by gravure coating to form an adhesive layer 3. After evaporating the solvent, the resin layer 2A was laminated on the resin layer 2B via an adhesive layer 3 by pressing with a roller at room temperature to obtain a temperature-sensitive reversibly deformable and thermochromic laminate 1.

The laminate 1 assumed a pink color and was fat with no curve at room temperature but turned colorless and curved toward the side of the resin layer 2A at 40° C. or above. At 10° C. or below, the laminate 1 curved toward the side of the resin layer 2B and showed a pinkish purple color when seen from the side of the resin layer 2B, while assuming a bluish purple color when seen from the side of the resin layer 2A. On being left to stand at room temperature, the laminate 1 was restored to its original pink and non-curved state. These changes in form and color occurred repeatedly with changes in temperature.

EXAMPLE 11

Figure 9:
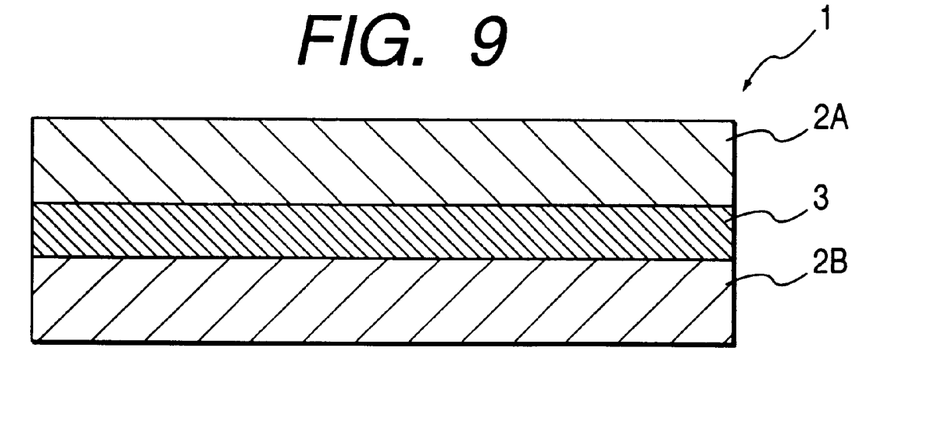

In this example, FIG. 9 is referred to. Five parts of a reversible thermochromic pigment (black at about 30° C. below and colorless at about 30° C. or above) prepared by encapsulating a reversible thermochromic material comprising 3 parts of 2-anilino-3-methyl-6-dibutylaminofluoran, 5 parts of bisphenol A, 25 parts of cetyl alcohol and 25 parts of stearyl caprate with an epoxy resin film, 0.5 part of a fluorescent pink pigment, 30 parts of a solution of a polyol resin in ethyl acetate and methyl ethyl ketone (solid content: 67%), 3 parts of an isocyanate curing agent, and 10 parts of ethyl acetate were mixed and dispersed to prepare an ink composition. A high-density polyethylene film (thickness: 50 μm; thermal expansion coefficient: 0.4%) as a resin layer 2B was coated with the ink composition by gravure coating to form an adhesive layer 3. After evaporating the solvents, a stretched polypropylene film (thickness: 50 μm; thermal expansion coefficient: 0%) as a resin layer 2A was laminated on resin layer 2B via the adhesive layer 3 by pressing with a roller to obtain a temperature-sensitive reversibly deformable and thermochromic laminate 1.

The laminate 1 was black and flat with no curve at room temperature but turned pink and curved toward the side of resin layer 2A at 40° C. or above. At 10° C. or below, the laminate 1 turned black and curved toward the side of the resin layer 2B. On being left to stand at room temperature, the laminate 1 was restored to its original black and non-curved state. These changes in form and color occurred repeatedly with changes in temperature.

EXAMPLE 12

Figure 10:
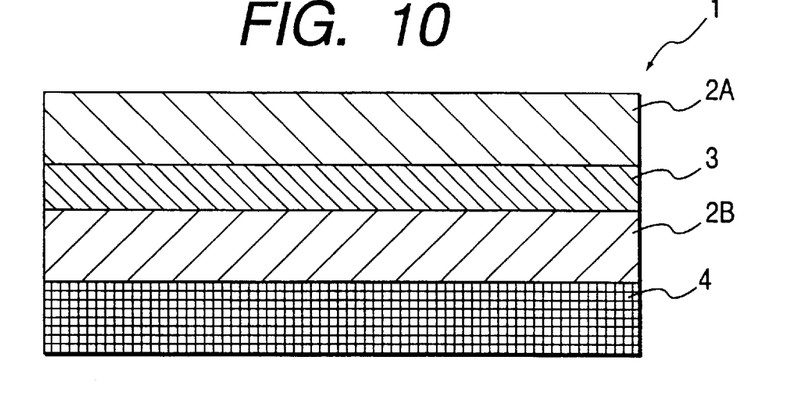

In this example, FIG. 10 is referred to. A low-density polyethylene film (thickness: 80 μm; thermal expansion coefficient: 1.1%) as a resin layer 2B was coated with a solution of an acrylic resin in toluene and ethyl acetate (solid content: 40%) by gravure coating to form an adhesive layer 3. After evaporating the solvent, a polyethylene terephthalate resin (thickness: 12 μm; thermal expansion coefficient: 0%) as a resin layer 2A was laminated thereon via adhesive layer 3 by pressing with a roller. The surface of resin layer 2B was coated with an adhesive solution of an acrylic resin in toluene and ethyl acetate (solid content: 40%) by gravure coating, and cotton cloth as a fabric 4 was adhered thereto and pressed with a roller to provide a temperature-sensitive reversibly deformable laminate 1.

The laminate 1 was in a non-curved state at room temperature (FIG. 10) but curved toward the side of the resin layer 2A at 40° C. or above and curved toward the side of the resin layer 2B at 10° C. or below. On being left to stand at room temperature, the laminate 1 was restored to its original non-curved state. These changes in form occurred repeatedly with changes in temperature.

EXAMPLE 13

Figure 11:
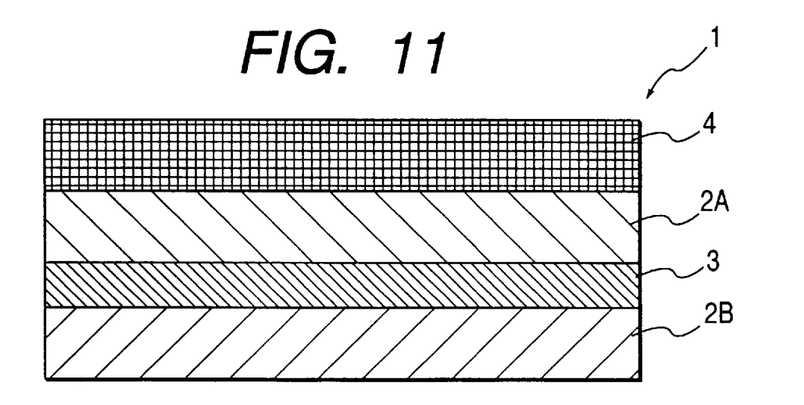

In this example, FIG. 11 is referred to. Five parts of a reversible thermochromic pigment (pink at about 30° C. below and colorless at about 30° C. or above) prepared by encapsulating a reversible thermochromic material comprising 3 parts of 1,2-benz-6-diethylaminofluoran, 5 parts of bisphenol A, 25 parts of cetyl alcohol, and 25 parts of stearyl caprate with an epoxy resin film, 0.5 part of a fluorescent yellow pigment, 30 parts of a solution of a polyol resin in ethyl acetate and methyl ethyl ketone (solid content: 67%), 3 parts of an isocyanate curing agent, and 10 parts of ethyl acetate were mixed and dispersed to prepare an ink composition. A low-density polyethylene film (thickness: 80 μm; thermal expansion coefficient: 1.1%) as a resin layer 2B was coated with the ink composition by gravure coating to form an adhesive layer 3. After evaporating the solvents, a polyethylene terephthalate film (thickness: 12 μm; thermal expansion coefficient: 0%) as a resin layer 2A was laminated on the resin layer 2B via the adhesive layer 3 by pressing with a roller. The surface of resin layer 2B was coated with an adhesive solution of an acrylic resin in toluene and ethyl acetate (solid content: 40%) by gravure coating, and cotton cloth as a fabric 4 was adhered thereto and pressed with a roller to obtain a temperature-sensitive reversibly deformable and thermochromic laminate 1.

The laminate 1 was flat with no curve at room temperature with the back of the cotton cloth assuming a red color. At 40° C. or above, the laminate 1 curved toward the side of the resin layer 2A, and the back of the cotton cloth turned yellow. At 10° C. or below, the laminate curved toward the side of the resin layer 2B, and the back of-the cotton cloth turned red. On being allowed to stand at room temperature, the laminate returned to its original flat state with the back of the cotton cloth assuming a red color. These changes in form and color occurred repeatedly with changes in temperature.

EXAMPLE 14

Figure 12:
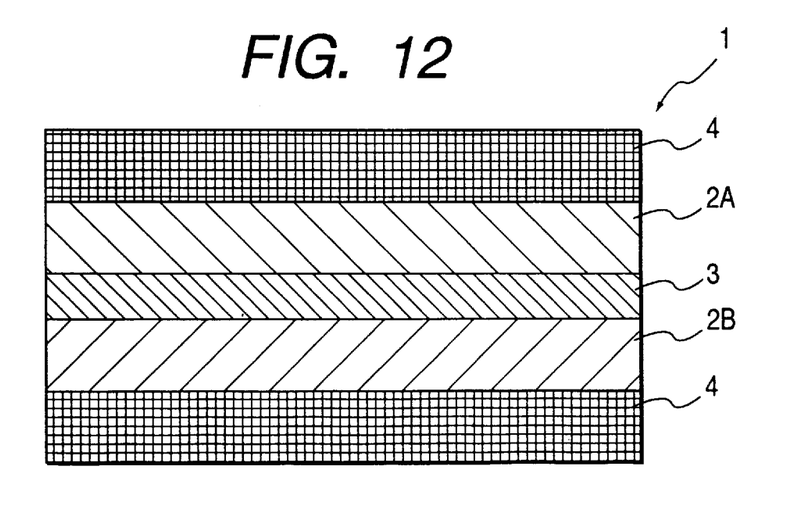

In this example, FIG. 12 is referred to. A high-density polyethylene film (thickness: 50 μm; thermal expansion coefficient: 0.4%) as a resin layer 2B was coated with an adhesive solution of an acrylic resin in toluene and ethyl acetate (solid content: 40%) by gravure coating to form an adhesive layer 3. After evaporating the solvents, a polystyrene film (thickness: 25 μm; thermal expansion coefficient: 0.05%) as a resin layer 2A was laminated on the resin layer 2B via adhesive layer 3 by pressing with a roller. The surface of the resin layer 2B was coated with a solution of an acrylic resin in toluene and ethyl acetate (solid content: 40%) by gravure coating, and cotton cloth as a fabric 4 was adhered thereto. The surface of the resin layer 2A was coated with a vinyl acetate-acrylic ester copolymer emulsion by doctor coating, and nylon cloth as a fabric 4 was adhered thereto to obtain a temperature-sensitive reversibly deformable laminate 1.

The laminate 1 was in a non-curved state at room temperature but curved toward the side of nylon cloth at 40° C. or above and toward the side of cotton cloth at 10° C. or below. On being allowed to stand at room temperature, the laminate was restored to its original non-curved state. These changes in form occurred repeatedly with changes in temperature.

EXAMPLE 15

Figure 13:
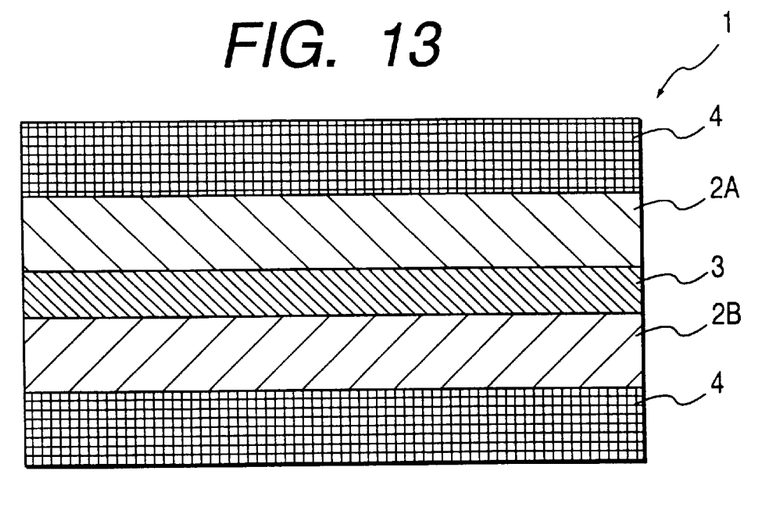

In this example, FIG. 13 is referred to. A high-density polyethylene film (thickness; 50 µm; thermal expansion coefficient: 0.4%) as a resin layer 2B was coated with a mixture consisting of 3 parts of a reversible thermochromic pigment (pink at about 30° C. below and colorless at about 30° C. or above) prepared by encapsulating a reversible thermochromic material comprising 3 parts of 1,2-benz-6-diethylaminofluoran, 5 parts of bisphenol A, 25 parts of cetyl alcohol, and 25 parts of stearyl caprate with an epoxy resin film, 2 parts of a reversible thermochromic pigment (blue at about 10° C. or below and colorless at about 15° C. or above) prepared by encapsulating a reversible thermochromic material comprising 1 part of 3-(2-ethoxy-4-diethylaminophenyl)-3-(1-ethyl-2-methylindol-3-yl)-4-azaphthalide, 4 parts of bisphenol A, 25 parts of myristyl alcohol, and 25 parts of decyl myristate with an epoxy resin film, 40 parts of an adhesive solution of an acrylic resin in toluene and ethyl acetate (solid content: 40%), and 1 part of a defoaming agent by gravure coating to form an adhesive layer 3. After evaporating the solvent, a polystyrene film (thickness: 25 µm; thermal expansion coefficient: 0.05%) as a resin layer 2A was laminated on an adhesive layer 3 by pressing with a roller.

A solution of an acrylic resin in toluene and ethyl acetate (solid content: 40%) was applied to the resin layer 2B by gravure coating, and lace as a fabric 4 was adhered thereto. A vinyl acetate-acrylic ester copolymer emulsion was applied to the resin layer 2A by doctor coating, and nylon cloth as the fabric 4 was adhered thereto to obtain a temperature-sensitive reversibly deformable and thermochromic laminate 1.

The laminate 1 was in a flat state with no curve at room temperature, assuming a pink color seen through the lace. At 40° C. or higher, the laminate 1 curved toward the side of the nylon cloth and turned colorless. At 10° C. or lower, the laminate curved toward the side of the lace, and a purple color could be seen through the lace. Upon being left to stand at room temperature, the laminate returned to its original non-curved state, assuming a pink color seen through the lace. These changes in form and color occurred repeatedly with changes in temperature.

EXAMPLE 16

Figure 14:
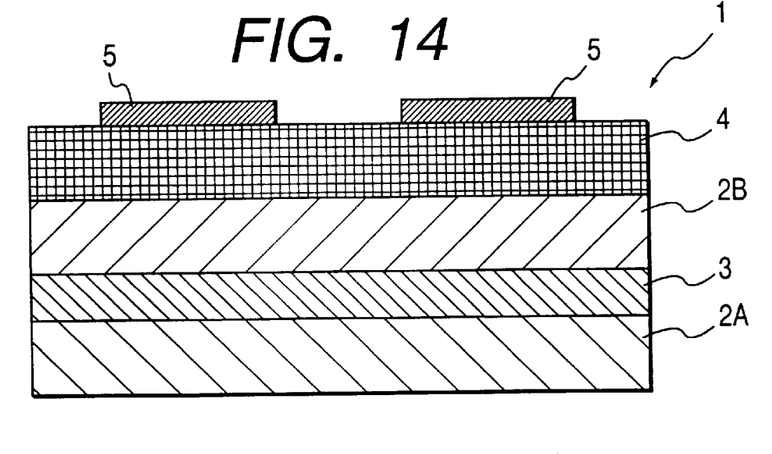

In this example, FIG. 14 is referred to. Twenty parts of a reversible thermochromic pigment (pink at about 30° C. below and colorless at about 30° C. or above) prepared by encapsulating a reversible thermochromic material comprising 3 parts of 1,2-benz-6-diethylaminofluoran, 5 parts of bisphenol A, 25 parts of cetyl alcohol, and 25 parts of stearyl caprate with an epoxy resin film, 30 parts of a polyurethane dispersion, and 0.1 part of a defoaming agent were mixed and dispersed to prepare an ink composition. The ink composition was printed on the cotton cloth of the laminate obtained in Example 12 by screen printing to obtain a temperature-sensitive reversibly deformable laminate 1 having a reversible thermochromic layer 5.

The laminate 1 was in a non-curved state and assumed a pink color at room temperature but curved toward the side of a resin layer 2A and turned colorless at 40° C. or above. At 10° C. or below the laminate turned pink and curved toward the side of the cotton cloth. On being left to stand at room temperature, the laminate was restored to its original pink and non-curved state. These changes in form and color occurred repeatedly with changes in temperature.

EXAMPLE 17

Figure 15:
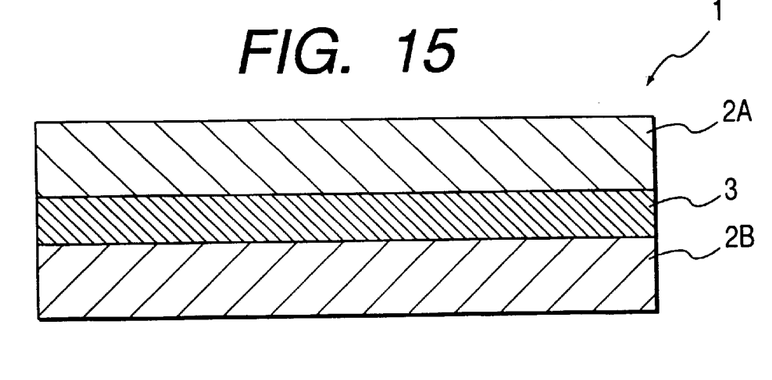

In this example, FIG. 15 is referred to. Three parts of titanium oxide-coated mica (Iriodine 300, produced by Merck & Co., Inc.), 30 parts of a solution of a polyol resin in ethyl acetate and methyl ethyl ketone (solid content: 67%), 3 parts of an isocyanate curing agent, and 10 parts of ethyl acetate were mixed and dispersed to prepare an ink composition. The ink composition was applied to a high-density polyethylene film (thickness: 50 µm; thermal expansion coefficient: 0.4%) as a resin layer 2B by doctor coating to form the adhesive layer 3. After evaporating the solvent, a stretched polypropylene film (thickness: 50 µm; thermal expansion coefficient: 0%) as a resin layer 2A was laminated thereon by pressing with a roller to obtain a temperature-sensitive reversibly deformable laminate 1.

The laminate 1 was gold and in a non-curved state at room temperature but curved toward the side of resin layer 2A at 40° C. or above or toward the side of the resin layer 2B at 10° C. or below. Upon being allowed to stand at room temperature, it returned to its original non-curved state. These changes in form occurred repeatedly with changes in temperature.

EXAMPLE 18

In this example, FIG. 15 is referred to. A glittering temperature-sensitive deformable laminate was prepared in the same manner as in Example 17, except for replacing Iriodine 300 with glitters (Diamond Piece Silver, produced by Daiya Kogyo K. K.).

The resulting laminate was silver and in a non-curved state at room temperature but curved toward the side of a resin layer 2A at 40° C. or above or toward the side of a resin layer 2B at 10° C. or below. Upon being allowed to stand at room temperature, it returned to its original non-curved state. These changes in form occurred repeatedly with changes in temperature.

EXAMPLE 19

Figure 16:
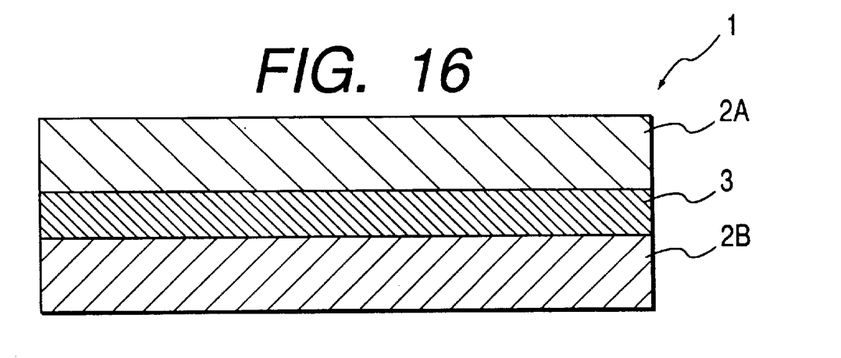

FIG. 16 is referred to. 98 part of a low-density polyethylene resin was mixed with 2 parts of a reversible thermochromic pigment (pink at about 30° C. below and colorless at about 30° C. or above) prepared by encapsulating a reversible thermochromic material comprising 3 parts of 1,2-benz-6-diethylaminofluoran, 5 parts of bisphenol A, 25 parts of cetyl alcohol, and 25 parts of stearyl caprate with an epoxy resin film, and the mixture was molded to prepare a 100 µm thick film (thermal expansion coefficient: 1.1%) as a resin layer 2B. An ink composition comprising 30 parts of a solution of an acrylic resin in toluene and ethyl acetate (solid content: 40%) and 3 parts of glitters (Diamond Piece Silver, produced by Daiya Kogyo K. K.) was applied to a resin layer 2B by doctor coating to form an adhesive layer 3. After evaporating the solvent, a stretched polypropylene film (thickness: 20 μm; thermal expansion coefficient: 0%) as a resin layer 2A was laminated thereon by pressing with a roller at room temperature to obtain a temperature-sensitive reversibly deformable and thermochromic laminate 1.

The laminate 1 was in a flat state with no curve and had a lustrous pink color at room temperature but curved toward the side of the resin layer 2A and turned colorless at 30° C. or above, and curved toward the side of the resin layer 2B and turned pink at 10° C. or below. Upon being allowed to stand at room temperature, it returned to its original pink and non-curved state. These changes in form and color occurred repeatedly with changes in temperature.

EXAMPLE 20

Figure 17:
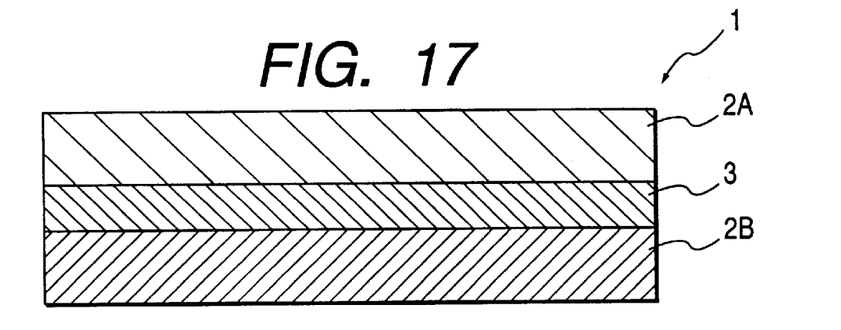

FIG. 17 is referred to. An iris-like multilayer film (IRIDESCENT FILM IF-8181R/G, produced by Mearl, U.S.; thermal expansion coefficient: 0.1%) as a resin layer 2B was coated with an adhesive solution of an acrylic resin in toluene and ethyl acetate (solid content: 40%) to form an adhesive layer 3. After evaporating the solvent, a high-density polyethylene film (thickness: 50 μm; thermal expansion coefficient: 0.4%) as a resin layer 2A was laminated on the resin layer 2B via the adhesive layer 3 by pressing with a roller at room temperature to obtain a temperature-sensitive reversibly deformable laminate 1.

The laminate 1 was in a non-curved state at room temperature but curved toward the side of the resin layer 2B at 40° C. or above, and curved toward the side of the resin layer 2A at 10° C. or below. Upon being allowed to stand at room temperature, it returned to its original non-curved state. These changes in form occurred repeatedly with changes in temperature.

EXAMPLE 21

In this example, FIG. 17 is referred to. A lustrous temperature-sensitive reversibly deformable laminate 1 was prepared in the same manner as in Example 20, except for replacing the iris-like multilayer film as a resin layer 2B with an aluminum-deposited film (Dialuster H-27, produced by Reikosha K. K.; thermal expansion coefficient: 0.1%).

The laminate 1 was in a non-curved state at room temperature but curved toward the side of the resin layer 2B at 40° C. or above, and curved toward the side of a resin layer 2A at 10° C or below. Upon being allowed to stand at room temperature, it returned to its original non-curved state. These changes in form occurred repeatedly with changes in temperature.

EXAMPLE 22

Figure 18:
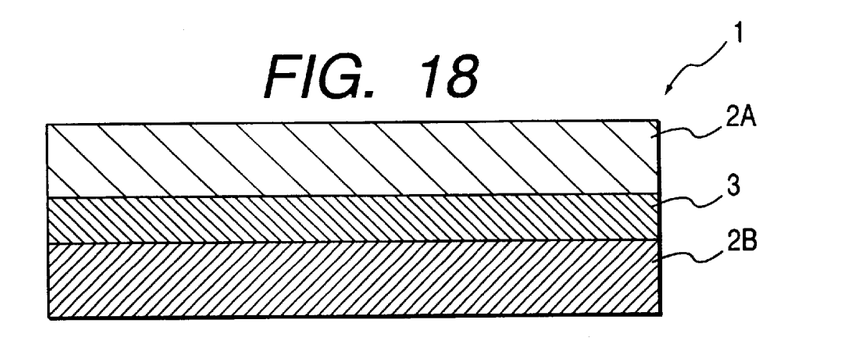

In this example, FIG. 18 is referred to. An aluminum-deposited film (Dialuster H-27, produced by Reikosha K. K.; thermal expansion coefficient: 0.1%) as a resin layer 2B was coated with an ink composition comprising 5 parts of a reversible thermochromic pigment (black at about 30° C. below and colorless at about 30° C. or above) prepared by encapsulating a reversible thermochromic material comprising 3 parts of 2-anilino-3-methyl-6-dibutylaminofluoran, 5 parts of bisphenol A, 25 parts of cetyl alcohol, and 25 parts of stearyl caprate with an epoxy resin film, 30 parts of a solution of a polyol resin in ethyl acetate and methyl ethyl ketone (solid content: 67%), 3 parts of an isocyanate curing agent, and 10 parts of ethyl acetate by gravure coating to form an adhesive layer 3. After evaporating the solvent, a high-density polyethylene film (thickness: 50 μm; thermal expansion coefficient: 0.4%) as a resin layer 2A was laminated on adhesive layer 3 by pressing non-curved with a roller at room temperature to obtain a temperature-sensitive reversibly deformable and thermochromic laminate 1.

The laminate 1 was in a non-curved state assuming a silver color on one side thereof and a black color on the other side at room temperature. When heated to 40° C. or above, the laminate 1 curved toward the side of the resin layer 2B while assuming a silver color on both sides thereof. At 10° C. or below, it curved toward the side of resin layer 2A and had a silver color on one side thereof and a black color on the other side. Upon being allowed to stand at room temperature, it returned to its original non-curved state with a silver color on one side and a black color on the other side. These changes in form and color occurred repeatedly with changes in temperature.

EXAMPLE 23

A high-density polyethylene film (50 μm; thermal expansion coefficient: 0.4%) was screen printed with an ink composition comprising 3 parts of a reversible thermochromic pigment (pink at about 30° C. below and colorless at about 30° C. or above) prepared by encapsulating a reversible thermochromic material comprising 3 parts of 1,2-benz-6-diethylaminofluoran, 5 parts of bisphenol A, 25 parts of cetyl alcohol, and 25 parts of stearyl caprate with an epoxy resin film, 2 parts of a reversible thermochromic pigment (blue at about 10° C. or below and colorless at about 15° C. or above) prepared by encapsulating a reversible thermochromic material comprising 1 part of 3-(2-ethoxy-4-diethylaminophenyl)-3-(1-ethyl-2-methylindol-3-yl)-4-azaphthalide, 4 parts of bisphenol A, 25 parts of myristyl alcohol, and 25 parts of decyl myristate with an epoxy resin film, 20 parts of a solution of an acrylic resin in toluene (solid content: 50%), 2 parts of an isocyanate curing agent, 20 parts of cyclohexanone, and 1 part of a defoaming agent. An acrylic urethane resin layer (thickness: 50 μm) containing the reversible thermochromic pigment was formed thereon to obtain a temperature-sensitive reversibly deformable and thermochromic laminate.

The resulting laminate was in a non-curved state assuming a pink color at room temperature. When heated to 40° C. or above, the laminate curved toward the side of the acrylic urethane resin layer while turning colorless. At 10° C. or below, it turned purple and curved toward the side of the high-density polyethylene film. Upon being allowed to stand at room temperature, it returned to its original non-curved state with a pink color. These changes in form and color occurred repeatedly with changes in temperature.

EXAMPLE 24

A low-density polyethylene film (thickness: 90 μm; thermal expansion coefficient: 1.1%) was coated with an adhesive solution of an acrylic resin in toluene and ethyl acetate (solid content: 40%). After evaporating the solvent, an unstretched polypropylene film (thickness: 50 μm; thermal expansion coefficient: 0.5%) was laminated thereon by pressing with a roller. The unstretched polypropylene film was coated with the same adhesive solution as used above. After evaporating the solvent, a polyethylene terephthalate film (thickness: 50 μm; thermal expansion coefficient: 0%) was further laminated thereon by pressing with a roller to obtain a temperature-sensitive deformable laminate.

The resulting laminate was in a flat state with no curve at room temperature. At 40° C. or above, the laminate curved toward the side of the polyethylene terephthalate layer. At 10° C. or below, the laminate curved toward the side of the polyethylene layer. Upon being allowed to stand at room temperature, the laminate was restored to its original non-curved state. These changes in form occurred repeatedly with changes in temperature.

EXAMPLE 25

Figure 19:
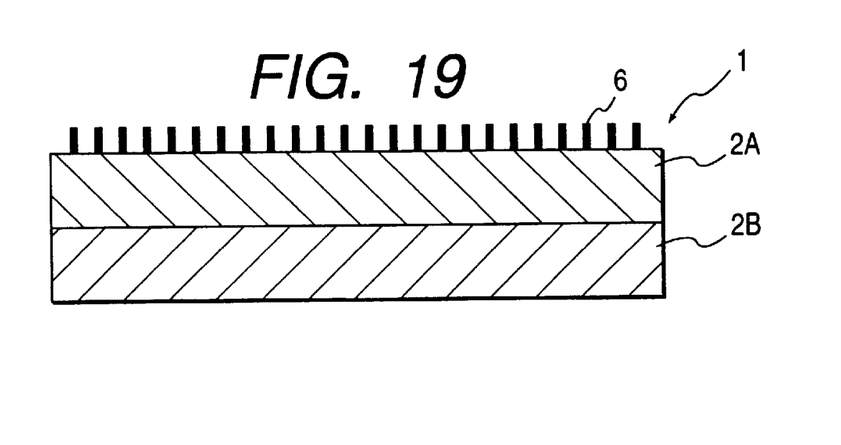

In this example, FIG. 19 is referred to. An adhesive composition prepared by mixing and dispersing an acrylic ester resin emulsion (solid content: 42%) and a thickener was applied to the resin layer 2A of the laminate prepared in Example 1 by gravure coating, and Bright Nylon Pile 6 (cut length: 1.5 mm; single fiber fineness: 3 denier) was applied thereon by a known flock coating technique to obtain a flock-coated temperature-sensitive reversible deformable laminate 1.

The laminate 1 was in a flat state with no curve at room temperature. At 40° C. or above, the laminate curved toward the flock-coated side. At 10° C. or below, the laminate curved toward the side of the resin layer 2B. Upon being allowed to stand at room temperature, the laminate was restored to its original non-curved state. These changes in form occurred repeatedly with changes in temperature.

EXAMPLE 26

A low-density polyethylene resin (thermal expansion coefficient: 1.1%) and a nylon resin (thermal expansion coefficient: 0%) were co-extruded and spun into a filament having a diameter of 3 mm by means of an extruder for manufacturing laminate type conjugate fiber composed of two different resins.

The resulting filament was straight at room temperature but curved toward the nylon resin side at 40° C. or above and toward the polyethylene resin side at 10° C. or below. Upon being allowed to stand at room temperature, the filament was restored to its original straight state. These changes in form occurred repeatedly with changes in temperature.

As described above, the temperature-sensitive reversibly deformable laminate according to the present invention changes its form visually to either side thereof with a change in temperature caused by a daily available heating or cooling means or a change of the weather to reversibly take three states; an original state at room temperature, a deformed state due to contraction in a low temperature, and a deformed state due to expansion in a high temperature. Such deformability can be obtained by relatively simple manipulations, such as properly combining conventional films or coating resin layers. A thermochromic layer can be provided in an appropriate position so that the laminate may synchronously change its color as well as its form with a change in temperature. The laminate can have a variety of appearances by flock coating or laminating fabric. A transparent iris-like multilayer film or a metallized film can be used to add a visual effect. The laminate can have a great variety of shapes by combining resin molded articles as resin layers. The laminate composed of films or coating resin layers can be slit into flat yarn, which could be used as hair of dolls, fur of stuffed animal toys, yarn for handcrafts or knitting, etc.

The laminate of the invention can be cut into desired shape and size for broad application as a constituent element of toys or dolls, such as stuffed toys, clothes of dolls, accessories of dolls (e.g., ribbons and other fancy goods), pop-up picture books, and the like, to add a visual charm of changing the form, an outstanding appearance, and a design effect.

While the invention has been described in detail and with reference to specific examples thereof, it will be apparent to one skilled in the art that various changes and modifications can be made therein without departing from the spirit and scope thereof.

What is claimed is:

1. A temperature-sensitive reversibly deformable laminate comprising:
   a plurality of resin layers having different coefficients of thermal expansion, said resin layers being bonded to each other;
   wherein said laminate is reversibly deformable towards both sides thereof with changes in temperature to take three states; an original state at room temperature, a contracted state at a low temperature, and an expanded state at a high temperature.

2. The temperature-sensitive reversibly deformable laminate according to claim 1, further comprising at least one thermochromic layer that changes its color reversibly with changes in temperature.

3. The temperature-sensitive reversibly deformable laminate according to claim 1, wherein said contracted state in a low temperature is a state in which one of said resin layers having a higher coefficient of thermal expansion contracts to deform said laminate toward the side of said resin layer, and said expanded state in a high temperature is a state in which said resin layer having a higher coefficient of thermal expansion expands to deform said laminate toward the side of the other resin layer having a lower coefficient of thermal expansion, each of the contracted and expanded states being maintained within the respective temperature ranges and being reversible with said original state exhibited at room temperature, and at least one of the three states being in a curved state.

4. A temperature-sensitive reversibly deformable laminate according to claim 1, wherein said low temperature is not lower than −20° C., and said high temperature is not higher than 80° C.

5. A temperature-sensitive reversibly deformable laminate according to claim 2, wherein said changing the color and changing the form take place synchronously.

6. A temperature-sensitive reversibly deformable laminate according to claim 1, wherein each of said resin layers comprises at least one of a molded resin film, a coating resin layer and a resin molded article.

7. A temperature-sensitive reversibly deformable laminate according to claim 1, wherein at least one of said resin layers contains a thermochromic material.

8. A temperature-sensitive reversibly deformable laminate according to claim 6, wherein said molded resin film is selected from a transparent thermoplastic resin film, a transparent iris-like multilayer film and a metallized film.

9. A temperature-sensitive reversibly deformable laminate according to claim 1, wherein said resin layers have a difference in coefficient of thermal expansion in the range of 0.001 to 20%, the coefficient of thermal expansion being obtained by equation:

$$\text{Coefficient of Thermal Expansion } (\%) = [(B-A)/A] \times 100$$

wherein A and B represent a found length (cm) of a specimen of a resin having been allowed to stand at 0° C. and 50° C., respectively, for 2 minutes, said specimen measuring 1 cm in width, 4.5 cm in length, and not more than 0.5 cm in thickness as prepared at room temperature.

10. A temperature-sensitive reversibly deformable laminate according to claim 1, wherein said laminate has a fabric bonded to an outermost resin layer thereof.

11. A temperature-sensitive reversibly deformable laminate according to claim 1, wherein said laminate has a flock coat on an outermost resin layer thereof.

12. A temperature-sensitive reversibly deformable laminate according to claim 1, wherein said laminate is a toy or a decorative element.

* * * * *